(12) United States Patent
Yakushigawa et al.

(10) Patent No.: US 9,643,225 B2
(45) Date of Patent: May 9, 2017

(54) EXTRUSION PRESS (75) Inventors: Atsushi Yakushigawa, Ube (JP);
Takeharu Yamamoto, Ube (JP)

(73) Assignee: Ube Machinery Corporation, Ltd. (JP)

(*) Notice: Subject to any disclaimer, the term of this patent is extended or adjusted under 35 U.S.C. 154(b) by 136 days.

(21) Appl. No.: 14/124,834

(22) PCT Filed: Jun. 1, 2012

(86) PCT No.: PCT/JP2012/064314
§ 371 (c)(1),
(2), (4) Date: Dec. 9, 2013

(87) PCT Pub. No.: WO2012/173005
PCT Pub. Date: Dec. 20, 2012

(65) Prior Publication Data
US 2014/0096581 A1    Apr. 10, 2014

(30) Foreign Application Priority Data
Jun. 15, 2011    (JP) .................... 2011-132853

(51) Int. Cl.
*B21C 23/21* (2006.01)
*F15B 11/042* (2006.01)
*H02P 29/60* (2016.01)

(52) U.S. Cl.
CPC ........ *B21C 23/211* (2013.01); *F15B 11/0426* (2013.01); *F15B 2211/20546* (2013.01); *F15B 2211/20576* (2013.01); *H02P 29/60* (2016.02)

(58) Field of Classification Search
CPC ....... B21C 23/21; B21C 23/211; B21C 31/00; B21C 27/00; B21C 23/215; B21C 23/214;
(Continued)

(56) References Cited

U.S. PATENT DOCUMENTS

2011/0203345 A1* 8/2011 Adolphy et al. ........... 72/453.02

FOREIGN PATENT DOCUMENTS

EP        0027743    *  4/1981
JP        56-59005 A    5/1981
(Continued)

OTHER PUBLICATIONS

Chinese First Office Action issued Dec. 3, 2014 along with an English translation from corresponding Chinese Patent Application No. 201280029043.1.
(Continued)

*Primary Examiner* — Moshe Wilensky
*Assistant Examiner* — Mohammad Yusuf
(74) *Attorney, Agent, or Firm* — DLA Piper LLP (US)

(57) ABSTRACT

The present invention provides an extrusion press which eliminates unevenness of dynamic and thermal fatigue degrees of the hydraulic devices which form the hydraulic circuit in the extrusion press, the electric motors which drive the hydraulic pump, the control devices, etc., which makes the dynamic and thermal fatigue degrees and remaining service lives of the component devices even, and which is excellent in energy saving effect.

An extrusion press which has a plurality of variable capacity type hydraulic pumps connected to it in parallel for supplying working oil to hydraulic cylinders of the extrusion press, uses a preset working speed as the basis to find the required discharge rate of the hydraulic pumps, and selectively controls the drive operations of the hydraulic pumps, wherein the order of selection of the hydraulic pumps which are selectively controlled in drive operation is controlled by a program which progressively advances when a predetermined number of molding cycles are completed.

1 Claim, 7 Drawing Sheets (58) Field of Classification Search
CPC .................. F15B 11/0426; F15B 11/04; F15B 2211/20546; F15B 2211/20576; F04B 49/06
See application file for complete search history.

(56) References Cited

FOREIGN PATENT DOCUMENTS

| | | |
|---|---|---|
| JP | 61-38182 A | 2/1986 |
| JP | 63-53002 U | 4/1988 |
| JP | 4-69684 U | 6/1992 |
| JP | 4-83729 U | 7/1992 |
| JP | 11-72087 A | 3/1999 |

OTHER PUBLICATIONS

Notice of Reasons for Rejection dated Jun. 16, 2015 of corresponding Japanese Application No. 2011-132853 along with an English translation.

* cited by examiner

| | PUMP SELECTION CIRCUIT | | | | WORKING SPEED (%) | | | | |
|---|---|---|---|---|---|---|---|---|---|
| | 1 | 2 | 3 | 4 | 0  25 | 50 | 75 | 100 | |
| RATIO TO MAX.DISCHARGE RATE OF PUMP (%) 0–100 | PUMP 10A | PUMP 10B | PUMP 10C | PUMP 10D | | | | | |
| 0–100 | PUMP 10B | PUMP 10C | PUMP 10D | PUMP 10A | | | | | |
| 0–100 | PUMP 10C | PUMP 10D | PUMP 10A | PUMP 10B | | | | | |
| 0–100 | PUMP 10D | PUMP 10A | PUMP 10B | PUMP 10C | | | | | |

| PROGRESSIVE ADVANCE | MOLDING CYCLE | ELAPSED TIME (min) | PUMP | | | |
|---|---|---|---|---|---|---|
| | | | 10 A | 10 B | 10 C | 10 D |
| 1 | 1 | 0 | ◎ | ○ | ○ | ○ |
| 2 | 2 | 10 | ○ | ◎ | ○ | ○ |
| 3 | 3 | 20 | × | × | ◎ | × |
| 4 | 4 | 30 | ○ | ○ | ○ | ◎ |
| 1 | 5 | 40 | ◎ | ○ | ○ | ○ |
| 2 | 6 | 50 | × | ◎ | × | × |

Fig. 6(b)

| PROGRESSIVE ADVANCE | MOLDING CYCLE | ELAPSED TIME (min) | PUMP | | | |
|---|---|---|---|---|---|---|
| | | | 10 A | 10 B | 10 C | 10 D |
| 1 | 1 | 0 | ◎ | ◎ | ○ | ○ |
| 2 | 2 | 10 | ○ | ◎ | ◎ | ○ |
| 3 | 3 | 20 | × | × | ◎ | ◎ |
| 4 | 4 | 30 | ◎ | ○ | × | ◎ |
| 1 | 5 | 40 | ◎ | ◎ | ○ | × |
| 2 | 6 | 50 | × | ◎ | ◎ | ○ |

Prior Art

| EXTRUSION OPERATION STROKE | NO-LOAD ADVANCE | UPSET | EXTRUSION | | | RETR-ACTION | RATIO TO TOTAL DISCHARGE RATE (%) |
|---|---|---|---|---|---|---|---|
| | | | INITIAL SPEED | EXTRUSION | FINAL SPEED | | |
| | WORKING SPEED (%) | | | | | | |
| | 100 | 80 | 15 | 20 | 10 | 100 | |
| RATIO TO MAX. DISCHARGE RATE OF PUMP (%) — PUMP No.1  0–100 | ▨ | ▨ | ▨ | ▨ | ▨ | ▨ | 0–25 |
| PUMP No.2  0–100 | ▨ | ▨ | | | | ▨ | 25–50 |
| PUMP No.3  0–100 | ▨ | ▨ | | | | ▨ | 50–75 |
| PUMP No.4  0–100 | ▨ | ▨ | | | | ▨ | 75–100 |

EXTRUSION PRESS

TECHNICAL FIELD

Cross-Reference to Related Application

The present invention claims priority based on Japanese. Patent Application No. 2011-132853 which was filed on Jun. 15, 2011, whose entire content is incorporated by reference in this Description.

The present invention relates to an extrusion press which is provided with a plurality of variable capacity type hydraulic pumps and which is used for extrusion of aluminum alloy etc.

Background Art

In general, when extruding a metal material, for example, an aluminum or aluminum alloy material, or other extrusion material (billet) by an extrusion press, a stem is attached to the front end of a main ram which is driven by hydraulic cylinders. The billet is stored in a container by the stem in a state pushing the container against a die. Further, the main ram is made to advance by a drive operation of the hydraulic cylinders to push the billet by the stem. Therefore, a product which is shaped is extruded from an outlet part of the die.

In this conventional type of extrusion press, high pressure oil is supplied from a plurality of variable capacity type hydraulic pumps which are connected in parallel to the hydraulic cylinders of the extrusion press so as to operate the extrusion press. Further, for example, pressurized oil is supplied to a main cylinder which drives the main ram by using a setting which was set by a working speed setter of the stem as the basis to find the necessary amount of oil and, when the required amount is less than a maximum discharge rate of one variable capacity type hydraulic pump, driving (loading) one variable capacity type hydraulic pump and using the oil discharged from the pump to supply the necessary amount of oil in flow rate control and making the remaining variable capacity type hydraulic pumps stop (unload). Further, when the necessary amount of oil is larger than the maximum discharge rate for one or more variable capacity type hydraulic pumps, the discharge rate from one or more variable capacity type hydraulic pumps which are driven (loaded) at the maximum discharge state or a value close to it and the discharge oil from a single variable capacity type hydraulic pump which is driven (loaded) in a variable discharge state so as to make up for any shortfall are used to supply the necessary amount of oil in flow rate control and making the remaining variable capacity type hydraulic pumps stop (unload).

Figure 7:
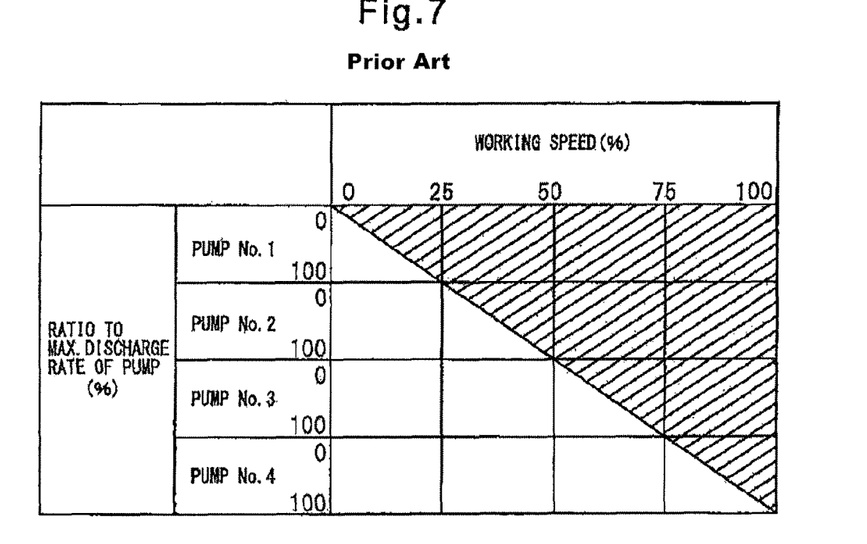
FIG. 7 is a view which shows a relationship among the working speed, the startup of hydraulic pumps, and the discharge rates of the pumps of the present invention in the prior art.

FIG. 7 shows the relationship of the drive (on-load) and stopping (unloading) of the pumps and the ratio of discharge rates of the hydraulic pumps to the necessary amount of oil, which corresponds to the working speed, in the extrusion process of a conventional type of extrusion presses which use four variable capacity type hydraulic pumps Nos. 1 to 4.

When the working speed (speed setting) is 0 to 25% of the capacity in range, that is, when the necessary amount of oil is 0 to 25% of the maximum discharge rate of all pumps in range, the single No. 1 hydraulic pump is driven (loaded), the discharge rate controller is used to control the discharge rate to 0 to 100% in range, and the necessary amount of oil is supplied from only the No. 1 hydraulic pump to operate the stem. At this time, the Nos. 2 to 4 hydraulic pumps are stopped (unloaded) and made the idling state. Further, at the stopped (unloaded) hydraulic pumps, not only are the hydraulic circuits in the unloaded state, but also the electric motors themselves which drive the hydraulic pumps are made to stop, so energy is saved.

Next, when the working speed (speed setting) is 25 to 50% of the capacity speed in range, that is, when the necessary amount of oil is 25 to 50% of the maximum discharge rate of all pumps in range, the two Nos. 1 and 2 hydraulic pumps are driven (loaded), the No. 1 hydraulic pump is controlled to give the maximum discharge rate, and the No. 2 hydraulic pump is controlled by the discharge rate controller to give a discharge rate of 0 to 100% in range to make up for any shortfall so as to supply the necessary amount of oil to operate the stem. At this time, the Nos. 3 to 4 hydraulic pumps are stopped (unloaded) and made the idling state.

Below, in the same way, when the working speed (speed setting) is 50 to 75% of the capacity speed in range, that is, when the necessary amount of oil is 50 to 75% of the maximum discharge rate of all pumps in range, the three Nos. 1 to 3 hydraulic pumps are driven (loaded), the Nos. 1 and 2 hydraulic pumps are controlled to give the maximum discharge rates, and the No. 3 hydraulic pump is controlled by the discharge rate controller to give a discharge rate of 0 to 100% in range to make up for shortfalls so as to supply the necessary amount of oil to operate the stem. At this time, the No. 4 hydraulic pump is stopped (unloaded) and made the idling state.

Further, when the working speed (speed setting) is 75 to 100% of the capacity speed in range, that is, when the necessary amount of oil is 75 to 100% of the maximum discharge rate of all hydraulic pumps in range, the Nos. 1 to 3 hydraulic pumps are made the maximum discharge rates and the No. 4 hydraulic pump which is controlled in discharge rate to 0 to 100% in range so as to make up for any shortfall are used to supply the necessary amount of oil. (See PLT 1.)

In this regard, in the no-load advance, upset, retraction, etc. of the extrusion press and other operations, the working pressure is also low. The hydraulic pumps are used in states close to the maximum discharge rates and the operating times, are also short (for example, 10 to 20 seconds or so). As opposed to this, in the extrusion process, the pumps are generally used at a low speed for long periods of time (for example, 1 to 10 minutes), so in a conventional extrusion press, the drive speeds, stopping frequency, load times, etc. of the plurality of hydraulic pumps become uneven.

In the extrusion press operation, the states of drive (on-load) and stopping (unloading) of the hydraulic pumps in the operation of the extrusion press and the ratios of the maximum discharge rates of the hydraulic pumps when the speed of movement of the stem is set to the speeds of 100% in no-load advance, 15% in upset, 15% in initial speed of extrusion, 20% in extrusion, 10% in final speed, and further 100% in retraction will be explained by FIG. 8.

Figure 8:
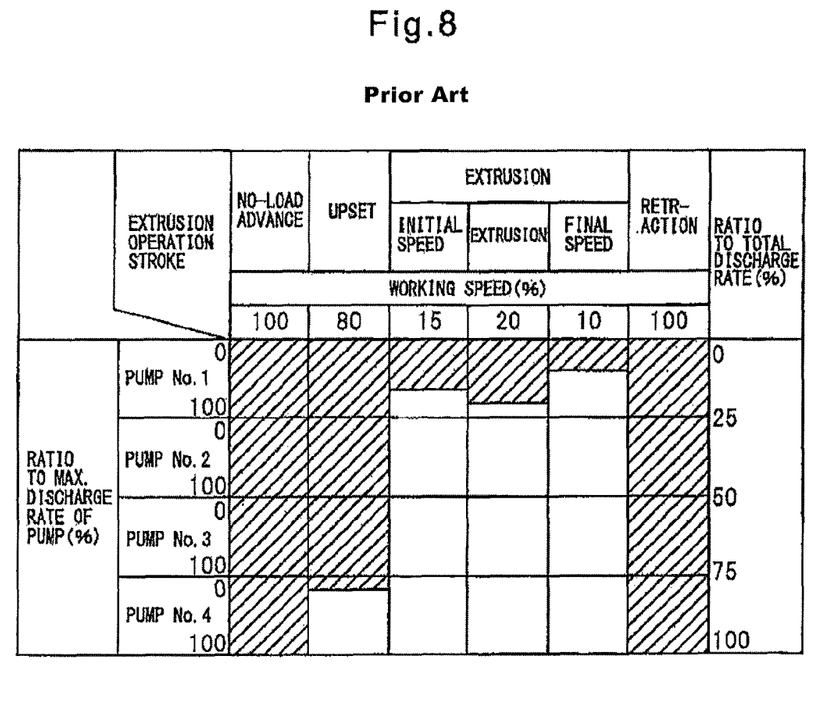
FIG. 8 is a view which shows a relationship among the working speed, the startup of hydraulic pumps, and the discharge rates of the pumps in the prior art.

As shown in FIG. 8, the speed of movement is the maximum speed of 100% at no-load advance and retraction and 80% at upset. All of the Nos. 1 to 4 hydraulic pumps can be driven (loaded) and can be uniformly operated.

At the initial speed of the extrusion process, the No. 1 hydraulic pump is driven (loaded) by a 15% setting, and the flow rate is controlled so as to become 60% of the maximum discharge rate with the No. 1 hydraulic pump. Further, in the extrusion, the No. 1 hydraulic pump is driven (loaded) at a 20% setting, and the flow rate is controlled: so as to become 80% of the maximum discharge rate with the No. 1 hydraulic pump. Furthermore, at the final speed, the No. 1 hydraulic pump is driven (loaded) at a 10% setting, and the flow rate is controlled so as to become 40% of the maximum discharge rate with the No. 1 hydraulic pump. In the extrusion process, the remaining Nos. 2 to 4 hydraulic pumps are in the stopped (unloaded) state.

In this way, in the extrusion process, only the No. 1 hydraulic pump is driven (loaded) in state, but the Nos. 2 to 4 hydraulic pumps are in the stopped (unloaded) state. In this way, in the hydraulic pumps, the load times of the drive (on-load) operations become uneven.

For this reason, the repeated operations of the hydraulic devices which form the hydraulic circuit, the electric motors which drive the hydraulic pumps, the control devices, etc. particularly act on specific hydraulic pumps so the dynamic fatigue becomes uneven. There was therefore the problem that variation occurs in the dynamic and thermal fatigue degrees and remaining service lifetime of the component devices.

Further, with the method of control of continuously stopping the high voltage (for example, 3.3 kV or 6.6 kV), high capacity (for example, 100 kW or more) electric motors for driving the hydraulic pumps which are used for the extrusion press in accordance with the unloaded states of the hydraulic pumps, there were problems such as generation of heat and burnout at the armatures of the electric motors (thermal fatigue), control was required for continuous operation for a predetermined interval (time interval) after stopping the pumps, and practical application to actual machinery was difficult.

CITATIONS LIST

Patent Literature

PLT 1: Japanese Patent Publication No. 56-59005A

SUMMARY OF THE INVENTION

Technical Problem

The present invention was made to solve this problem and has as its object the provision of an extrusion press which eliminates unevenness of dynamic and thermal fatigue degrees of the hydraulic devices which form the hydraulic circuit in the extrusion press, the electric motors which drive the hydraulic pump, the control devices, etc., which makes the dynamic and thermal fatigue degrees and remaining service lives of the component devices even, and which is excellent in energy saving effect.

Solution to Problem

To achieve the above object, the extrusion press according to a first aspect of the present invention is an extrusion press which has a plurality of variable capacity type hydraulic pumps connected to it in parallel for supplying working oil to hydraulic cylinders of the extrusion press, uses a preset working speed as the basis to find the required discharge rate of the hydraulic pumps, and selectively controls the drive operations of the hydraulic pumps, characterized in that the order of selection of the hydraulic pumps which are selectively controlled in drive operation is controlled by a program which progressively advances when a predetermined number of molding cycles are completed.

The extrusion press according to a second aspect of the present invention is comprised of the invention which is described in the first aspect characterized in that when providing the required discharge rate in the extrusion process and the remaining hydraulic pumps are in the unloaded state, the electric motors which drive the remaining hydraulic pumps are controlled to stop.

The extrusion press according to a third aspect of the present invention is comprised of the invention which is described in the second aspect characterized in that control for stopping the electric motors is performed in the case where a predetermined continuous operating time has elapsed from the previous stopping operation or when a detected armature temperature of the electric motor is lower than a predetermined set temperature.

Advantageous Effects of Invention

In the extrusion press system of the present invention, the order of selection of hydraulic pumps which are selectively controlled to be driven in accordance with the speed setting of the extrusion press is controlled by a program which progressively advances with each predetermined molding cycle, the unevenness of the dynamic and thermal fatigue degrees of the hydraulic devices which form the hydraulic circuit of the hydraulic press, the electric motors which drive the hydraulic pumps, the control devices, etc. can be eliminated, the dynamic and thermal fatigue degrees and remaining service life of the component devices can be made even, and suitable operational management is possible.

In the extrusion press of the present invention, when providing the necessary discharge rate in the extrusion process (process of extruding billet from die by stem) and the remaining hydraulic pumps are in the unloaded state, the electric motors which drive the remaining hydraulic pumps are controlled to stop, so waste of power can be reduced. Further, this is made control when considering the characteristics of the electric motors and a predetermined continuous operation time elapses from the previous stopping action or when the detected temperature of the armatures of the electric motors is lower than a predetermined set temperature, so it is possible to drive and stop the pumps during the process without causing thermal fatigue.

The present invention will become more clearly understood from the attached drawings and the explanation of preferred embodiments of the present invention.

DESCRIPTION OF EMBODIMENTS

Figure 1:
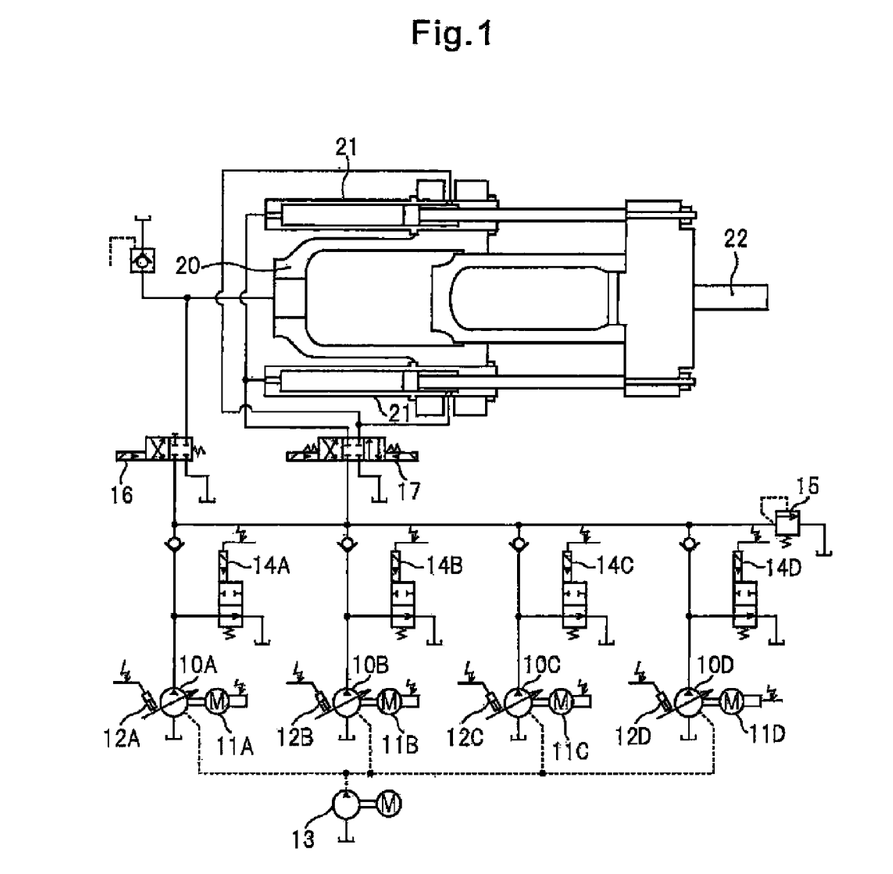
FIG. 1 is a view which explains a hydraulic circuit of an extrusion press of the present invention.

Below, embodiments of the extrusion press of the present invention will be explained with reference to the drawings. FIG. 1 is an explanatory view of a hydraulic circuit of an extrusion press according to an embodiment.

Reference notations 10A to 10D which are shown in the figures are variable capacity type hydraulic pumps, while 11A to 11D are electric motors which drive the hydraulic pumps. Reference notations 12A to 12D are discharge rate control means of the variable capacity type hydraulic pumps. These use flow rate control signals to control the tilt angles of the hydraulic pumps and adjust the discharge rates. Further, each of the variable capacity type hydraulic pumps 10A to 10D is set with the same maximum discharge rate. Reference notation 13 indicates a fixed discharge capacity type hydraulic pump which supplies pilot pressure to the devices which form the hydraulic circuit.

Reference numerals 14A to 14D are solenoid valves which selectively switch between driving (loading) and stopping (unloading) of the hydraulic pumps for supplying the necessary amount of oil which is found based on the setting which is set by a working speed setter, while 15 is a relief valve which sets the pressure of the hydraulic circuit. A solenoid valve 16 which supplies pressurized oil to a main cylinder 20 is arranged, and pressurized oil is supplied to side cylinders 21 through solenoid valves 17. Due to this, an extrusion stem 22 is made to advance and retract. Further, not shown control devices are provided. The electric motors 11A to 11D are configured to be controlled to be driven and stopped by an output signal based on the setting which is set at the working speed setter and a control signal based on the detected armature temperatures and operating times of the electric motors 11A to 11D.

The selective drive operation in the thus configured hydraulic circuit, that is, the relationship of the working speed, drive (on-load) and stopping (unloading) of the hydraulic pumps, and amounts of discharge of the hydraulic pumps, will be explained. Note that, the maximum discharge rate of one hydraulic pump is set to 25% of the discharge rate of all pumps.

When the working speed (speed setting) is 0 to less than 25% of the capacity speed in range, that is, the necessary amount of oil is 0 to less than 25% of the maximum discharge rate of all pumps in range, a predetermined single (for example, 10A) hydraulic pump is driven (loaded). Furthermore, the discharge rate controller is used to control the discharge rate to 0 to 100% in range. The necessary amount of oil is supplied from only the selected single (for example, 10A) hydraulic pump to operate the stem. At this time, the remaining (for example, 10B to 10D) three pumps are stopped (unloaded) to make them the idling state.

Next, when the working speed (speed setting) is 25% to less than 50% of the capacity speed in range, that is, in when the necessary amount of oil is 25% to less than 50% of the maximum discharge rate of all hydraulic pumps in range, a predetermined two (for example, 10A and 10B) hydraulic pumps are driven (loaded), control is performed so that the hydraulic pump 10A becomes the maximum discharge rate, the hydraulic pump 10B is controlled in discharge rate to 0 to 100% in range by the discharge rate controller of the pump 10B so as to make up for any shortfall, and therefore the necessary amount of oil is supplied to operate the stem.

At this time, the remaining hydraulic pumps (for example, 10C and 10D) are stopped (unloaded) to make them the idling state.

Below, similarly, when the working speed (speed setting) is 50% to less than 75% of the capacity speed in range, that is, when the necessary amount of oil is 50% to less than 75% of the maximum discharge rate of all pumps in range, a predetermined three (for example, 10A to 10C) hydraulic pumps are driven (loaded), control is performed so that the hydraulic pumps 10A and 10B become the maximum discharge rate, the hydraulic pump 10C is controlled in discharge rate to 0 to 100% in range by the discharge rate controller of the pump 10C so as to make up for any shortfall, and therefore the necessary amount of oil is supplied to operate the stem. At this time, the remaining hydraulic pump (for example, 10D) is stopped (unloaded) to make it the idling state.

Further, when the working speed (speed setting) is 75% to 100% of the capacity speed in range, that is, when the necessary amount of oil is 75% to 100% of the maximum discharge of all hydraulic pumps in range, all hydraulic pumps are driven (loaded), a predetermined three (for example, 10A to 10C) hydraulic pumps are made maximum in discharge rate, and one (for example, 10D) hydraulic pump is controlled in discharge rate to 0 to 100% in range in order to make up for any shortfall so as to thereby supply the necessary amount of oil.

In the above way, the setting which is set by the working speed setter of the extrusion press is used as the basis to selectively drive the hydraulic pumps and the discharge rates of the hydraulic pumps are controlled so that the necessary amount of oil is supplied.

Figure 2:
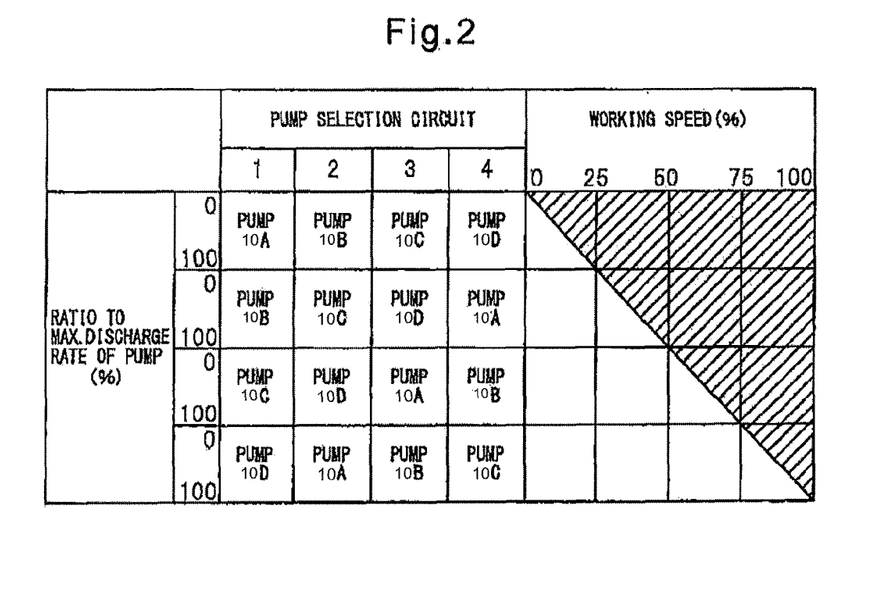
FIG. 2 is a view which shows a relationship among the working speed, the startup of hydraulic pumps, and the discharge rates of the pumps of the present invention.

FIG. 2 will be used to explain the control for progressively advancing the order of selection of hydraulic pumps which are selectively controlled to be driven in the present invention. The program for controlling the plurality of pump selection circuits is provided in accordance with the number of hydraulic pumps which form the hydraulic circuit of the extrusion press (in the present invention, there are four hydraulic pumps, so comprised of four selection circuits).

With the program 1, first, the hydraulic pump 10A, next 10B (threshold value 25%), further 10C (threshold value 50%), and finally 10D (threshold value 75%) are driven (loaded) in that order.

With the program 2, first, the hydraulic pump 10B, next 10C (threshold value 25%), further 10D (threshold value 50%), and finally 10A (threshold value 75%) are driven (loaded) in that order.

With the program 3, first, the hydraulic pump 10C, next 10D (threshold value 25%), further 10A (threshold value 50%), and finally 10B (threshold value 75%) are driven (loaded) in that order.

With the program 4, first, the hydraulic pump 10D, next 10A (threshold value 25%), further 10B (threshold value 50%), and finally 10C (threshold value 75%) are driven (loaded) in that order.

In the above way, the pump selection circuits 1 to 4 are progressively advanced. The progression is repeated again from circuit 1 in the control.

In the present invention, the above four programs 1 to 4 are progressively advanced for a predetermined number of molding cycles. If advancing from the programs 1 to 4 to operate the extrusion press, all hydraulic pumps are operated under the same conditions. This program is stored in the control device from the start of operation. When the product shape changes and the extrusion conditions are changed, the programs are continued after the previous program by which the previous operation has been completed. For example, when the molding operation is completed by the program 3 with the number of molding cycles set to one, the next molding operation is started from the program 4.

In a conventional extrusion press, the threshold values which are set for the plurality of hydraulic pumps are individually set in a fixed manner, so the load concentrated at specific hydraulic pumps and unevenness of dynamic and thermal fatigue degrees was invited. However, in the present invention, the hydraulic pumps are progressively driven (loaded) in the configuration, so the concentration of load at hydraulic pumps and the unevenness of the dynamic and thermal fatigue degrees are eliminated and the remaining service lives of the devices which form the hydraulic circuit and the devices which control the same can be made even.

The number of molding cycles may be set to a suitable value from the total number of products which are formed (number of extruded parts) and the replacement time of the die etc. at each molding cycle, that is, after the extrusion of one product at a time or a plurality of products.

Figure 3:
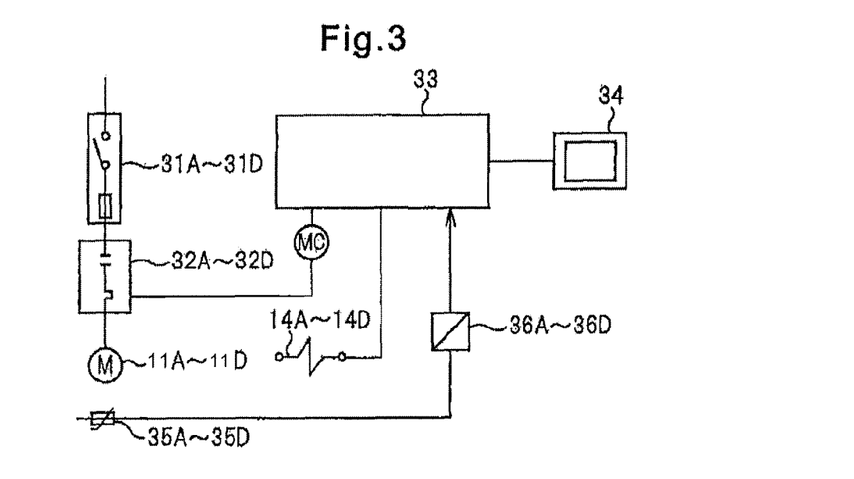
FIG. 3 is a block diagram which shows an electric motor starting/stopping circuit in the hydraulic pump selection control of the present invention.

With reference to FIG. 3, an electric motor startup/stopping circuit in the pump selection control of the above configuration will be explained.

For example, when the power voltage is 3.3 kV, wiring protectors (fuses and disconnect switches) 31A to 31D, vacuum electromagnetic contactors 32A to 32D, and electric motors 11A to 11D are used to form a power circuit. The starting and stopping of the electric motors 11A to 11D are controlled by the vacuum electromagnetic contactors 32A to 32D which are connected to the output of a programmable logic controller (PLC) 33. The solenoid valves 14A to 14D are connected to the output of the programmable logic controller (PLC) 33 and operate based on the operation signals at the time of stopping, unloading, and startup of electric motors during selection control (setting substantially no-load state and reducing startup load).

The electric motors 11A to 11D which contain built-in temperature detection sensors 35A to 35D which detect the temperature of the armature are used. The temperature data which are detected by the temperature detection sensors 35A to 35D are input through the converters 36A to 36D to the programmable logic controller (PLC) 33.

The temperature detection of the electric motors 11A to 11D is not restricted to the temperature data of the armatures. For example, it is also possible to attach temperature detection sensors to the frames of the electric motors and use that detected temperature data. The temperature data in the case of attaching sensors to the electric motor frames is used when considering the temperature difference from the armature parts and performing processing in the programmable logic controller (PLC) 33.

A touch panel 34 or other data input means is provided. The speed setting which is required for selection control of the hydraulic pumps 10A to 10D, the billet length for obtaining the optimum timing for restart right before completion of the extrusion process, the thickness of the discard, and other extrusion conditions are input. This data is used as the basis for operation of the extrusion press.

Next, judgment for permitting starting and stopping of the electric motors in the hydraulic pump selection control according to an embodiment of the present invention will be explained. If electric motors in which the number of possible starts and stops per hour in the specifications set for the electric motors 11A to 11D is used as the judgment criteria and, for example, three starts and stops per hour are allowed, control for stopping once in 20 minutes becomes possible. Furthermore, by attaching temperature detection sensors 35A to 35D to the electric motors, it becomes possible to estimate the temperatures of the armatures and control selection while protecting the electric motors. In addition, when the temperature level is low, control becomes possible to stop the electric motors within the above time restrictions. Along with the control for stopping the electric motors, the energy saving effect can be improved.

Figure 4:
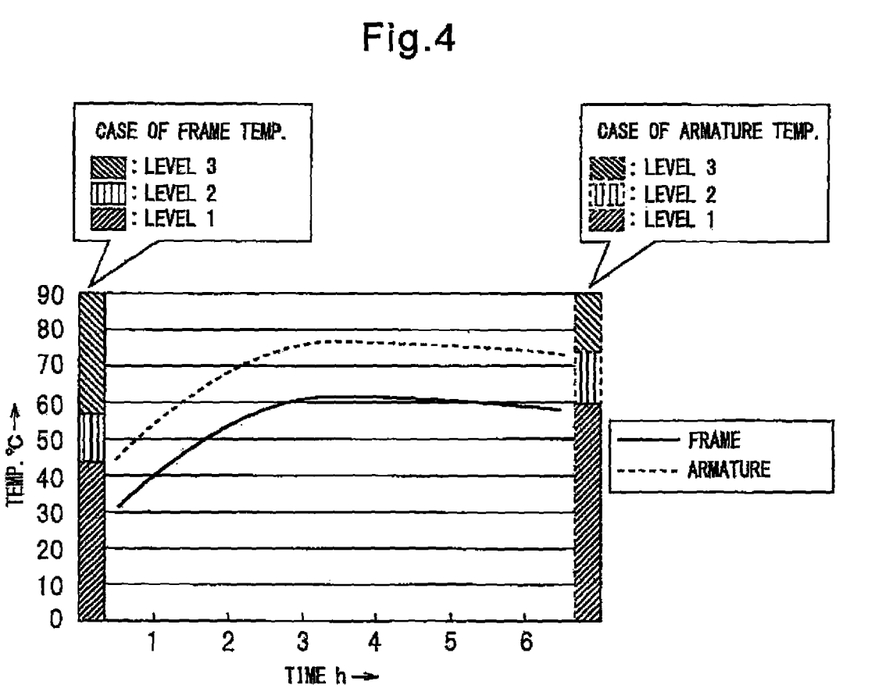
FIG. 4 is a view which explains a temperature rise of an electric motor frame and armature in the case of continuously operating an electric motor which is used in the present invention at a close to 100% load state.

The temperature graph of FIG. 4 envisions a rise in temperature of the electric motor frame and armature in the case of continuous operation of an electric motor in load state close to a 100% load. In the figure, the broken line shows the detection temperature at the armature of the electric motor, while the solid line shows the detection temperature at the frame of the electric motor. Data comprised of this temperature data which further considers the amount of temperature rise accompanying starting and stopping is calculated. The calculated data is stored in the programmable logic controller (PLC) 33. The data is judged divided into levels of a level 1 of a state of a low temperature (temperature of armature of less than 45° C.), a level 2 of a rise of temperature (temperature of armature of 45° C. to less than 58° C.), and a level 3 of a state of a high temperature (temperature of armature of 58° C. or more).

In FIG. 4, level 1 means the state where the temperature of the electric motor (armature or frame) is low and starting and stopping are possible even within a prescribed time, level 2 means the state where the gradient of rise of temperature becomes steeper when starting and stopping while the temperature of the electric motor (armature or frame) is rising, and level 3 means the state where the temperature of the electric motor (armature or frame) is high, the normal upper limit on the temperature rise ends up being exceeded, and starting and stopping become prohibited.

Figure 5:
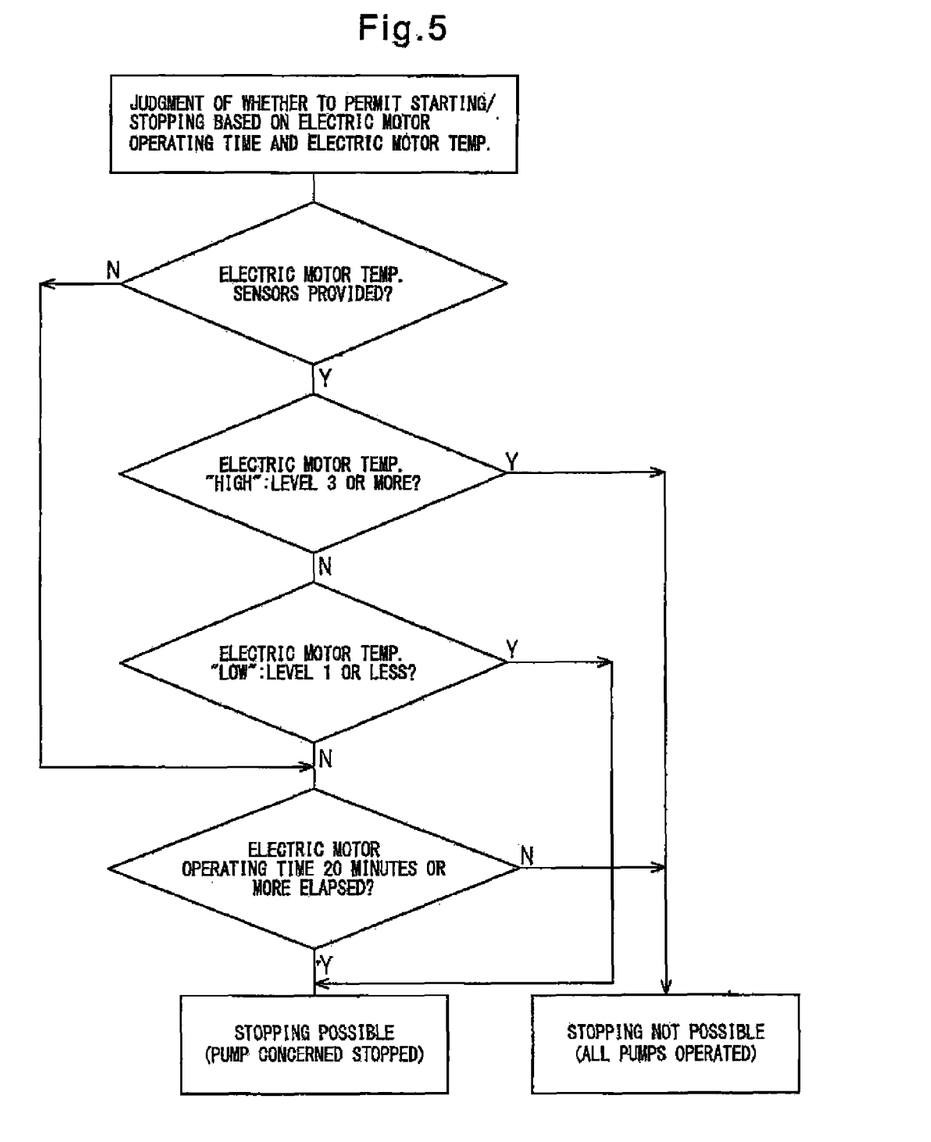
FIG. 5 is a view which explains a flow of stopping an electric motor in an extrusion process of the present invention.

FIG. 5 shows the flow of judgment as to whether to permit stopping by the operating time and temperature of the electric motor (armature). When the electric motor has no temperature detection sensors 35A to 35D, whether to permit stopping is judged by just the operating time from the rated numbers of starts and stops which is shown by the electric motor manufacturer. In this embodiment, it is judged if the continuous operating time is 20 minutes or more. This judgment flow shows the case of an electric motor which is started and stopped three times per hour.

On the other hand, when the temperature detection sensors 35A to 35D are provided, as shown in FIG. 5, a judgment according to the temperature level is added. If the temperature level of the electric motor is in the range of "3", stopping due to selection control is not permitted. When in the range of the level 1, stopping is possible even if the continuous operating time is less than 20 minutes. Further, when in the range of the level 2, stopping becomes possible after continuous operation for 20 minutes or more.

The operations and stopped states of the electric motors 11A to 11D in the extrusion process based on the progressive cycle which is shown in FIG. 2 and the flow which is shown in FIG. 5 (no temperature detection sensors) are shown in FIG. 6. When the temperature detection sensors 35A to 35D are provided, if the temperature level of the electric motors 11A to 11D is "1", it is possible to further increase the stopped states and possible to obtain further energy saving effects.

In FIG. 6, the double circles (⊚) show the driven (loaded) states of the hydraulic pumps, the circles (○) show the stopped (unloaded) states of the hydraulic pumps, and the x'es (x) show the no-rotation stopped states of the hydraulic pumps. Further, the number of molding cycles is set as one (progressive advance when number of set cycles is ended) where one cycle is made 10 minutes. The progressive advance number which is shown in FIG. 6 is the program of the pump selection circuits 1 to 4 which are shown in FIG. 2.

Figure 6A:
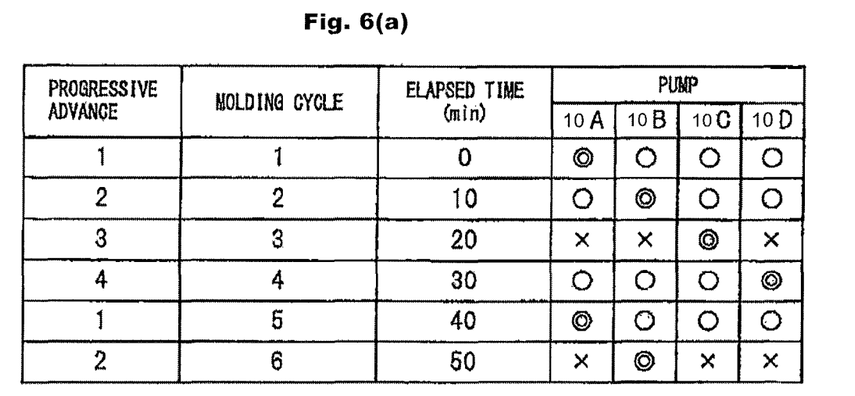
FIG. 6 is a view which explains an operating state of a hydraulic pump in an extrusion process of the present invention.
Figure 6B:
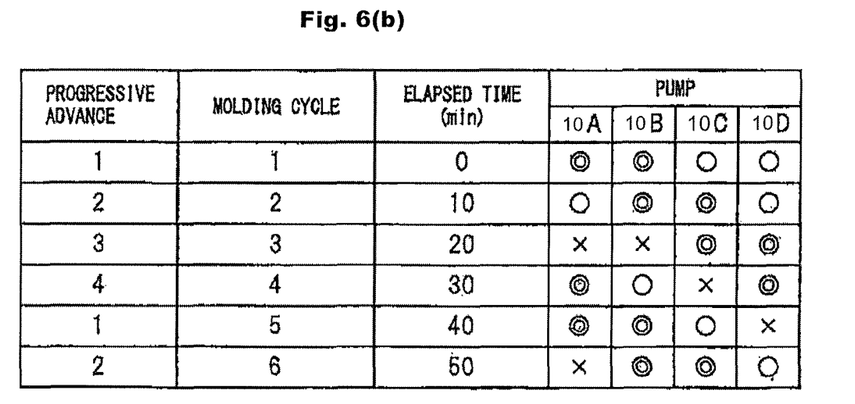

In FIG. 6, FIG. 6(a) shows the temperature when the setting of the extrusion speed is less than 25%, while FIG. 6(b) shows the case where the setting of the extrusion speed is 25% to less than 50%. The electric motors which are stopped are all ones within one hour from the start of operation and ones where the temperatures of the electric motors are also level 2 or less. Further, they are ones where more than 20 minutes have elapsed from the previous state of stopping and therefore which can be stopped.

As shown in FIG. 6(a), the extrusion speed is set to less than 25%, there is one hydraulic pump which, is started (loaded), and the hydraulic pump which is started every time a product is extruded is progressively advanced to 11A and 11B. In FIG. 6(b), the extrusion speed is set to 25% to less than 50%, there are two hydraulic pumps which are started (loaded), and the combination of hydraulic pumps which are started every time a product is extruded is progressively advanced.

As explained above, in the extrusion press of the present invention, when a hydraulic pump is selectively stopped (unloaded) during the extrusion process, the electric motor which drives that hydraulic pump is also selectively stopped, so the amount of consumption of energy can be slashed, unevenness of the dynamic and thermal fatigue degrees of the power devices, control devices, etc. can be eliminated, and the component devices can be made even in dynamic and thermal fatigue degrees and remaining service life.

The present invention is explained with reference to specific embodiments which were selected for the purpose of explanation, but numerous modifications are possible without departing from the basic concept and scope of the present invention as clear to a person skilled in the art.

REFERENCE SIGNS LIST 10A to 10D variable discharge type hydraulic pump
11A to 11D electric motor
12A to 12D discharge rate control means
14A to 14D solenoid valve
15 relief valve
20 main cylinder
21 side cylinder
32A to 32D vacuum electromagnetic contactor
35A to 35D temperature detection sensor

The invention claimed is:
1. An extrusion press comprising:
hydraulic cylinders that move an extrusion stem;
a plurality of variable capacity hydraulic pumps connected in parallel with each other that supply working oil to the hydraulic cylinders, wherein an order of operation is assigned to each of the hydraulic pumps so that the hydraulic pumps are successively driven in accordance with a required amount of working oil of the hydraulic cylinders;
a plurality of electric motors dedicated to the respective hydraulic pumps that drive the plurality of hydraulic pumps; and
a control unit that changes the order of operation such that among the plurality of hydraulic pumps, a hydraulic pump assigned a first order of operation becomes a hydraulic pump assigned a last order of operation and the order of operation of remaining hydraulic pumps of the plurality of hydraulic pumps other than the first order of operation progressively advances one by one after a predetermined number of molding cycles have been completed, wherein, when one or more of the plurality of hydraulic pumps are in an unloaded state in which the working oil is not supplied to the hydraulic cylinders, during an extrusion process, the control unit stops the respective electric motors for the one or more hydraulic pumps in an unloaded state
when a predetermined continuous operating time has elapsed from a previous stopping operation or when a detected armature temperature of the respective electric motors are lower than a predetermined set temperature.

* * * * *